(12) United States Patent
Williamson et al.

(10) Patent No.: US 12,204,683 B2
(45) Date of Patent: Jan. 21, 2025

(54) INTEGRATIONS PLATFORM WITH INTERACTION AND ABSTRACTION WITH A THIRD PARTY PLATFORM

(71) Applicant: Concentrix CVG Customer Management Delaware LLC, Cincinnati, OH (US)

(72) Inventors: Matthew Williamson, Fredericton (CA); Andrew Steven Bird, Frisco, TX (US); Scott MacSwain, Fredericton (CA); Sam Heaton, Fredericton (CA); Nicholas Guimond, Fredericton (CA); Joshua Clowater, Fredericton (CA)

(73) Assignee: CONCENTRIX CVG CUSTOMER MANAGEMENT DELAWARE LLC, Cincinnati, OH (US)

( * ) Notice: Subject to any disclaimer, the term of this patent is extended or adjusted under 35 U.S.C. 154(b) by 220 days.

(21) Appl. No.: 17/973,022

(22) Filed: Oct. 25, 2022

(65) Prior Publication Data
US 2023/0161910 A1    May 25, 2023

Related U.S. Application Data

(60) Provisional application No. 63/282,757, filed on Nov. 24, 2021.

(51) Int. Cl.
*G06F 21/62* (2013.01)
(52) U.S. Cl.
CPC .............................. *G06F 21/6272* (2013.01)

(58) Field of Classification Search
CPC .... G06F 21/6218–6236; G06F 21/6245–6263; G06F 21/6272; G06N 20/00; H04L 63/10–105; H04L 63/20; H04L 67/10
See application file for complete search history.

(56) References Cited

U.S. PATENT DOCUMENTS

| | | | |
|---|---|---|---|
| 2013/0159468 A1* | 6/2013 | Kusterer | H04L 67/2895 709/219 |
| 2014/0089027 A1* | 3/2014 | Brown | G06Q 10/06311 705/7.15 |
| 2015/0222723 A1 | 8/2015 | Adapalli et al. | |
| 2018/0316808 A1* | 11/2018 | Nakawaki | H04N 1/00474 |
| 2021/0109769 A1* | 4/2021 | Yang | G06N 20/00 |

OTHER PUBLICATIONS

PCT ISR PCT/US2022/050670 on Mar. 13, 2023.
(Continued)

*Primary Examiner* — Kevin Bechtel
(74) *Attorney, Agent, or Firm* — Dority & Manning, P.A.

(57) ABSTRACT

Systems and methods for providing an integration platform for abstracting and interacting with one or more third party platforms provided by one or more third party computing systems can include the utilization of one or more abstraction blocks and one or more application programming interfaces. In some implementations the systems and methods can include a user interface that can leveraged as an intermediary for intaking user inputs, processing the user inputs, and providing abstracted versions of the inputs to the third party computing systems in order to provide access to the third party platforms to the user.

5 Claims, 10 Drawing Sheets

(56) References Cited

OTHER PUBLICATIONS

Keen et al., Patterns: Extended Enterprise SOA and Web Services, Chapters 1-12, XP93026323, IBM, Jan. 2006, 386 pages.
Schiavo et al., FaaS: Federation-as-a-Service, The Sunfish Cloud Federation Solution Technical Report, XP55870119, Dec. 2016. Retrieved from Internet: https://arxiv.org/ftp/arxiv/papers/1612/1612.03937.

* cited by examiner

INTEGRATIONS PLATFORM WITH INTERACTION AND ABSTRACTION WITH A THIRD PARTY PLATFORM

RELATED APPLICATIONS

This application claims priority to and the benefit of U.S. Provisional Patent Application No. 63/282,757, filed Nov. 24, 2021. U.S. Provisional Patent Application No. 63/282,757 is hereby incorporated by reference in its entirety.

FIELD

The present disclosure relates generally to providing an interface for interface for providing users with an integration platform for interacting with and abstracting a plurality of third party platforms. More particularly, the present disclosure relates to providing an intermediary interface that can provide abstraction and equal footing for the plurality of third party platforms.

BACKGROUND

Communication platforms can allow users to have access to a contact center platform. However, utilizing multiple communication platforms from multiple third party service providers can be tedious and time consuming. The terminology and data intake can vary greatly from one third party service provider to another. Therefore, switching between different communication platforms can be difficult.

Additionally, different third party service providers may not have all of the same features. Pricing models may also differ between third party service providers, which can lead to users having to choose between the pricing model that works best for them or the provider with the features they need the most.

Contact centers can rely on software in order to route calls to the appropriate agents. This software has traditionally been something utilized from input premises or data centers. This may have been done in a licensing and/or port model. Costs may have been capitalized because they purchased those licenses. When CCaaS came along CCaaS changed the model while still being primarily license based, which allowed for more geographic flexibility and ongoing maintenance and upgrading that can be done in the "cloud". This posed problems because a user may still be in a rigid system defined by the CCaaS provider.

The problem allowed for Communication Platform as a Service to rise (i.e., CPaaS). The promise of separating out the "apps" and the "services", can allow for more flexibility and the ability to build user-customized apps on their services and transport layer. This can give more customization through the use of API's. The challenge can be that "who" is going to do this customization. More specifically, contact centers may either be staffed or contracted out to a third party for the application development.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include one or more processors and one or more non-transitory computer-readable media that collectively store instructions that, when executed by the one or more processors, cause the computing system to perform operations. The operations can include providing a user interface. The user interface can include one or more interactive elements. The operations can include obtaining a request from a user computing device to receive a third party service. The third party service can be a particular service provided by a third party computing system. The request can be received via an interaction with the one or more interactive elements of the user interface. The operations can include providing access to the third party service, via the third party computing system, to one or more clients associated with the user computing device. The operations can include generating usage data associated with a use of the third party service by the one or more clients associated with the user computing device. Information descriptive of an entity identity associated with the third party computing system can be removed from recordation data when generating the usage data. In some implementations, the entity identity can include one or more identifiers for a third party associated with the third party computing system. The recordation data can be descriptive of one or more interactions with the one or more clients. The operations can include providing the usage data to the user computing device.

Another example aspect of the present disclosure is directed to a computer-implemented method. The method can include obtaining, by a computing system including one or more processors, a plurality of datasets associated with a plurality of different third party platforms. The method can include providing, by the computing system, a user interface to a user computing device. The user interface can abstract one or more identities of the plurality of different third party platforms. The method can include receiving, by the computing system, a request from the user computing device to receive one or more third party service features. In some implementations, the one or more third party service features can be provided via one or more of the plurality of different third party platforms. The method can include processing, by the computing system, the request to generate a flow representation. The flow representation can include a graphical representation descriptive of a plurality of third party service features provided based on the utilization of the one or more of the plurality of different third party platforms. In some implementations, the plurality of third party service features can include the one or more third party service features. The plurality of third party service features can be determined based on the plurality of datasets. The method can include providing, by the computing system, the flow representation for display via the user interface.

Another example aspect of the present disclosure is directed to a computing system. The computing system can include one or more processors and one or more non-transitory computer-readable media that collectively store instructions that, when executed by the one or more processors, cause the computing system to perform operations. The operations can include provide a user interface. In some implementations, the user interface can include one or more interactive elements. The operations can include obtain a request from a user computing device to receive a third party service from a third party computing system. The request can be received via an interaction with the one or more interactive elements of the user interface. The operations can include provide access to the third party service to one or more clients associated with the user computing device and generate usage data associated with a use of the third party service by the one or more clients associated with the user computing device. In some implementations, the operations can include provide the usage data to the user computing device.

Another example aspect of the present disclosure is directed to a computer-implemented method for providing an integration platform. The method can include obtaining, by a computing system including one or more processors, a plurality of datasets associated with a plurality of different third party platforms. The method can include providing, by the computing system, a user interface to a user computing device. In some implementations, the user interface can abstract one or more identities of the plurality of different third party platforms. The method can include receiving, by the computing system, a request from the user computing device to utilize one or more of the plurality of different third party platforms and processing, by the computing system, the request to generate an abstracted request. In some implementations, the method can include sending, by the computing system, the abstracted request to a particular third party platform and providing, by the computing system, access to the particular third party platform to the user computing device via the user interface.

Another example aspect of the present disclosure is directed to a computing system. The computing system can include one or more processors and one or more non-transitory computer-readable media that collectively store instructions that, when executed by the one or more processors, cause the computing system to perform operations. The operations can include obtain a request to access a specific platform type and obtain user data. In some implementations, the user data can include one or more user preferences. The operations can include process the request and the user data to generate an abstracted user request dataset and provide the abstracted user request dataset to a first third party platform. In some implementations, the operations can include receive access to the first third party platform based at least in part on the abstracted user request dataset and provide abstracted access to the first third party platform to a user associated with the user data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
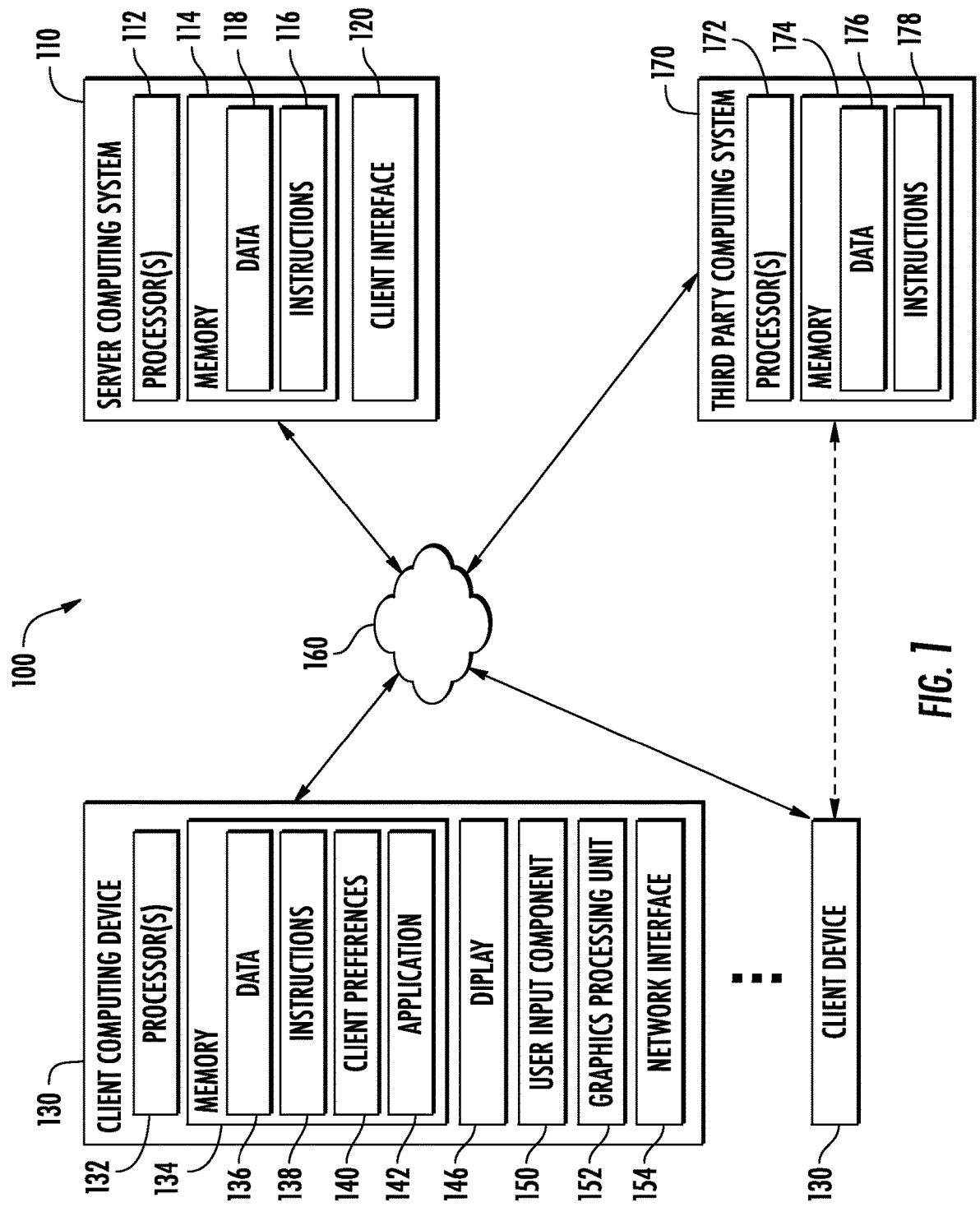
FIG. 1 depicts a block diagram of an example computing system that performs third party platform interaction facilitations according to example embodiments of the present disclosure.

Reference numerals that are repeated across plural figures are intended to identify the same features in various implementations.

DETAILED DESCRIPTION

Overview

Generally, the present disclosure is directed to an integration platform as a service for providing access to and tracking the use of third party services (e.g., third party provided communications platform as a service). The systems and methods disclosed herein can leverage middleware and a receptive user interface to facilitate and track the services provided to a user. In particular, the systems and methods disclosed herein can centralize the deployment, configuration, maintenance, and billing for services (e.g., contact centers) with a simplified workflow for all stakeholders. Additionally and/or alternatively, the systems and methods can allow a user to access the services of multiple third party providers via a singular user interface in order to provide a streamline and user friendly medium for accessing third party computer-provided services.

In some implementations, the systems and methods can include providing a user interface. The user interface can include one or more interactive elements. The systems and methods can include obtaining a request from a user computing device to receive a third party service from a third party computing system. The request can be received via an interaction with the one or more interactive elements of the user interface. Access to the third party service can be provided to one or more clients associated with the user computing device based on the request. Usage data can then be generated based on the use of the third party service by the one or more clients associated with the user computing device. The usage data can then be provided to the user computing device.

In some implementations, providing access can include obtaining client data from the one or more clients associated with the user computing device, retrieving third party data from the third party computing system based on the client data, and providing the third party data to the user computing device. The usage data can include a quantization of an amount of the third party service used by the one or more clients associated with the user computing device.

Additionally and/or alternatively, the third party service can include a communication platform as a service.

In some implementations, the systems and methods can include providing access to a second third party service to the one or more clients associated with the user computing device. The second third party service can be provided by a second third party computing system. The third party computing system and the second third party computing system can be different. The systems and methods can then generate second usage data associated with a use of the second third party service by the one or more clients associated with the user computing device, determine combined usage data based on the usage data and the second usage data, and provide the combined usage data to the user computing device.

The systems and methods disclosed herein can include obtaining a plurality of datasets associated with a plurality of different third party platforms and providing a user interface to a user computing device. In some implementations, the user interface can abstract one or more identities of the plurality of different third party platforms. A request from the user computing device can then be received. The request can be a request to utilize one or more of the plurality of different third party platforms. The request can then be processed to generate an abstracted request, which can then be sent to a particular third party platform. The systems and methods can then provide access to the particular third party platform to the user computing device via the user interface.

In some implementations, the user interface can include one or more add-on features that determine and provide data associated with a service provided by the particular third party platform. Additionally and/or alternatively, the systems and methods can include providing a plurality of interactive elements associated with a plurality of different contact center features. In some implementations, the particular third party platform may include a contact center.

The systems and methods can include obtaining a request to access a specific platform type and obtaining user data. In some implementations, the user data can include one or more user preferences. The request and the user data can be processed to generate an abstracted user request dataset. The abstracted user request dataset can then be provided to a first third party platform. The systems and methods can then receive access to the first third party platform based at least in part on the abstracted user request dataset and provide abstracted access to the first third party platform to a user associated with the user data.

The systems and methods may further obtain an updated request to switch platforms, provide the abstracted user request dataset to a second third party platform, receive access to the second third party platform, and provide abstracted access to the second third party platform. Additionally and/or alternatively, the systems and methods may provide a cancel request to the first third party platform.

In some implementations, the specific platform type can include a communication platform. The communication platform can include a contact center feature, and the contact center feature can include one or more mediums for: obtaining client data and providing answer data in response to the client data.

Abstracted access to the first third party platform can be provided via a user interface that can provide the abstracted access without providing third party platform identifiers.

In some implementations, the systems and methods can include obtaining one or more inputs associated with the abstracted access to the first third party platform and adjusting the one or more user preferences of the user data. Alternatively and/or additionally, the systems and methods can store the abstracted user request dataset. The systems and methods may include generating an application programming interface based at least in part on the abstracted user request dataset.

In some implementations, the abstracted access can be provided via a user interface that includes a plurality of interactive features. The plurality of interactive features can include one or more add-on interactive features provided in addition to one or more first third party platform features. In some implementations, the one or more add-on interactive features can include tracking data associated with a usage of the first third party platform.

The systems and methods disclosed herein can be utilized to create a platform that abstracts away the use of CPaaS providers (e.g., Twilio Flex and Amazon Connect). The systems and methods can include an iPaaS platform that can interact with CPaaS providers and/or other third party platform providers. These providers can solve many problems of underlying region-specific telephony provisioning, scalability of services, routing, etc., and may have evolved in the space to support full stack programmatic control of a contact center via APIs and SDKs, with full omnichannel support for the modern contact center. The problem may be in the complexity of deployment and management of contact centers built on top of these offerings. Each CPaaS can have their own context in terms of API specifications and their own definitions of the core concepts of a contact center, both from a configuration perspective (e.g., agents, admins, queues, skills, capacity, channels), and from an operational perspective (e.g., lifecycle of a contact in Connect or interaction in Flex). The systems and methods disclosed herein can centralize and normalize both the management and operation of contact centers using any CPaaS platform (or other third party platform), on a cloud provider infrastructure, and position the company to be able to rapidly deploy value-add services and integrations in one place that can enhance CPaaS offerings.

In some implementations, the systems and methods can be utilized to deploy and manage a contact center built on top of third party platforms. Additionally and/or alternatively, the systems and methods can bring additional value to all platforms through value-add services such as WEM and AI. Moreover, the systems and methods can bring centralization and simplicity to additional third-party integrations.

In some implementations, the systems and methods can be configured to deploy a contact center into a CPaaS without ever using that CPaaS directly.

The systems and methods may include a centralized data model for both operational and billing & usage data to be normalized and represented outside of any CPaaS implementation. The systems and methods can provide a means to visualize reporting easily, which can include one or more pre-canned reports.

Additionally and/or alternatively, the systems and methods can include an abstraction block for abstraction of Admin and Agent experience (UIs) to be consistent, regardless of what third party platform (e.g., different CPaaS's) is being used under the covers. The systems and methods can further include a centralized value-add, cloud-agnosticism, monitoring and metrics, and other features.

In some implementations, the systems and methods disclosed herein can include a contact center instance that needs to be able to be created as a definition, be portable, and completely CPaaS-agnostic, outside of the details of how it is (or might be) implemented within a CPaaS. The normalization of a contact center instance definition can be the key to divorcing us from any specific CPaaS, and the key for the system can be to own that definition on top of all CPaaS providers.

The systems and methods can centralize the creation and control of a contact center definition (basic interactive CRUD interface), and can provide the ability to apply, change, read, and delete that definition against an underlying CPaaS provider of choice within the context of the iPaaS systems disclosed herein.

The abstraction of CPaaS provider from a contact center configuration perspective can occur. The administrators and agents can log into the respective CPaaS-platform-provided user interface once the contact center can be created (admin and agent experience abstractions will come in a later deliverable).

In some implementations, a user can log into the user interface, create a basic vanilla contact center, choose a CPaaS, a region, add a few agents and an admin, choose a simple skill, and queue. Then the user can configure a basic flow that describes incoming and/or outgoing traffic for the contact center, then click "deploy". The user can see the deployment steps occurring in real time through a single pane of glass (the UI). After the deployment process is complete, the user can perform inbound and outbound interactions with my new contact center using the CPaaS provided user interface for both administrators and agents. In some implementations, this portion can be obfuscated.

In some implementations, the systems and methods can include continuing to improve and maintain the platform. For example, the system can release updates and changes to the SaaS in any and all instances of iPaaS globally easily without friction. This can include a working story of Cl/CD and change management that is forward-facing and using modern cloud-based technologies.

In some implementations, a user can select any contact center instance in their control, then potentially redeploy it to a new region, or with a new underlying CPaaS. In other words, the user can migrate a contact center from one CPaaS to another, or within the same CPaaS to another region. In some implementations, the user can log into the iPaaS UI and import an existing contact center instance from a third party platform (that may not have been initially created with iPaaS) into the iPaaS context. From there, the user can undeploy it, then re-deploy it elsewhere, or with a different underlying CPaaS. In other words, the user can pull a contact center that was not initially created with the iPaaS into control of the iPaaS, and then manipulate and/or migrate it.

The systems and methods can have the capability of CRUD'ing contact centers from a centralized UI. The systems and methods can allow for the ability to bill customers, and additionally, offer a centralized and normalized data model for consumption. The systems and methods can then provide a small set of pre-canned reports that will consume this data model out of the box, and access to a rich data API for consumption by third party.

The two main data models can each serves a different purpose, and each can have a completely different chain of custody and consumer for the respective data therein.

Firstly, the billing and usage data model can focus on what the system needs to gather to be able to automate billing of customers without manual intervention. This data can be thought of as the power meter on a house. This data model may not concern itself with the how and the why of the usage, but the what, for billing purposes. Data specific to that monthly billing period such as number of Interactions, active agents, concurrent agents, channels used, etc. can be tracked.

Therefore, the user can see all usage data and invoices respective of any contact center that the user may be managing. Moreover, the user can see all billing and usage history, and can answer any questions that a customer might have regarding their bill.

Additionally and/or alternatively, a user can see general usage trends for specific customers that they are interested in engaging for sales opportunities. The user can see clearly if their usage is decreasing or increasing.

The user can log into a basic reporting portal a view the following basic reports for my contact center. All reports may be elegant, have sort filters, and may be customizable as a user views them, and may have a data range to be specified. The user can save their reports to return later and view (e.g., Interaction Report—basic report of the Interactions within my contact center, Agent Report—basic report of metrics surrounding agent activity, a few KPI Reports—First Contact Resolution (FCR), etc.).

In some implementations, the systems and methods can include one or more points for abstraction. For example, in some implementations, the systems and methods can include six points of abstraction (e.g., configuration/provisioning, billing and usage model, operational data model, administrative experience, agent experience, and/or one or more other abstractions).

Configuration/provisioning abstracting can include the systems and methods providing the means to deploy/configure/provision a contact center on any CPaaS without having to know any details surrounding what that task would look like within the respective CPaaS as a technical support person.

The systems and methods can understand queues, skills, routing, inbound versus outbound considerations, and the like. Additionally and/or alternatively, the systems and methods can know how to map those concepts to the underlying CPaaS that is being configured, and does so seamlessly. Thus, at the point of configuration and provisioning for a contact center, the user can see this abstraction point.

The billing and usage data model abstraction point can exist around the collection of usage data that is specific to billing. Each respective CPaaS that the system can integrate with will have data that the system will need to collect in order to bill customers. This data can automatically be collected by the iPaaS and can be brought into a centralized data model. The details of how to get this data, and what it means may not be required to be fully understood by technical people—the iPaaS can abstract that away and can know how to collect the data automatically.

The operational data model abstraction point can include each CPaaS may have the concept of interactions (contacts in Connect, for example), and may provide metrics and data surrounding the operational behavior of a CCaaS. SLA, agent behavior, all of which may be operational data that is highly valuable and may be required for any customer.

The iPaaS may automatically pull all of this data back into a normalized data model that the system can support with clear and understandable data definitions. In front of that data model, the system may support rich APIs that customers can integrate with and can provide their own pre-canned data reports that can meet the needs of most customers with small to medium sized contact centers who do not need customization.

The abstraction can be highly valuable as it can allow one data model, with one definition, no matter the underlying CPaaS provider, to be acted on at will. This can be where the system would integrate WEM, AI, and other integrations to support the modern contact center.

The administrator experience abstraction point can include each CPaaS having administrative capabilities (e.g., to monitor agents, see reporting, change configurations, change business hours, add departments, etc.). The abstraction point can provide a consistent single Administrator Concentrix look and feel.

The agent experience abstraction point can include each respective CPaaS having the ability to create apps or use their app for agents. Some can provide APIs, some can provide SDKs, and some can provide pre-canned web apps. The iPaaS can abstract this away and can provide a single UI for all agents that may have a singular look and feel. This UI can provide the system with the ability to integrate with third parties very easily, and that work can be done once, and may work for all underlying CPaaS providers.

The systems and methods disclosed herein can take the flexibility of CPaaS and can give the user the capability of not only distinguishing between the "apps" and "services" it can also abstract the propriety function and definitions of those API's and can use common contact center practices and functions in order to build the user a contact center on any one of a plurality of CPaaS's provided by third party providers. This lexicon can give the contact center choice and can allow for complete Geographical Agnosticism as well as transport portability that the user may not normally have. The apps can become truly divorced from the services layer such that the user can truly pick and choose which way to go. The iPaaS can provide an abstraction and translation layer that can allow for a unique way to gain the benefits of the CPaaS solution and the appearance of a Unified solution.

In some implementations, the systems and methods disclosed herein can include skills-based approximation. For example, CPaaS vendors (e.g., third party communication platform providers) can have their own implementation details for the services a user may need. The implementation details can include specific nomenclature, a unique lexicon, and functional components/pieces that represent a contact center and the contact center's routing behavior. The systems and methods disclosed herein can include an algorithm around the approximation of skills-based routing from a contact center existing in a CPaaS that does not, natively, conceptualize skills-based routing.

For example, in the integration platform of the system, work can be routed into a contact center and to respective agents based on the skills of those agents (among other factors). Skills can be in the system's lexicon. Therefore, when the system integrates a pre-existing contact center that does not conceptualize routing and contact center behavior in this manner (e.g., one in particular has absolutely no concept of skills at all) and the system may be expected to pull back the configuration of this instance of a contact center from that respective CPaaS, the system can approximate a representation of something that ultimately is not there in that contact center.

The systems and methods can complete the task algorithmically by inferring skills of agents in a CPaaS that do not exist by building out data structures and doing pattern recognition on those data structures. The process can include an input and an output, and can allow information that was not there previously to be inferred. The skills-based approximation can make CPaaS integrations "align" to a higher-level agnostic representation of a contact center. In some implementations, the systems and methods can see a high amount of value in the possibility in the potential transformation of a contact center representation into something potentially more simple, flexible and scalable than it was previously.

The systems and methods may receive a request to receive one or more third party services from a user. The systems and methods can provide the one or more third party services to the user via a third party computing system. The access may be provided based on a determination that the third party computing system provides the one or more third party services. Access to the one or more third party services can include providing access to the one or more third party services to one or more clients associated with the user computing system. Additionally and/or alternatively, the systems and methods can determine communication with the third party computing system is interrupted. Determining communication with the third party computing system is interrupted can include determining one or more application programming interfaces experience an error associated with a particular action not being able to be performed. Alternatively and/or additionally, determining communication with the third party computing system is interrupted can include a notification associated with the third party computing system indicating a platform error. The determination may be based on web error notification. The systems and methods can determine one or more additional third party computing systems provide the third party service. Determining the one or more additional third party computing systems provide the third party service can include determining one or more skills provided by the one or more additional third party computing systems based on routing data for the one or more additional third party computing systems. In some implementations, the third party service can include the one or more skills. The systems and methods can provide access to the third party service, via the one or more additional third party computing systems, to the one or more clients associated with the user computing device.

The systems and methods can obtain a plurality of datasets associated with a plurality of different third party platforms. The plurality of datasets can include metadata associated with the plurality of different third party platforms. Additionally and/or alternatively, the plurality of datasets can include data descriptive of one or more third party services provided by each of the plurality of different third party platforms. In some implementations, the plurality of datasets can include routing data, historical data, and/or identification data associated with each of the plurality of different third party platforms.

A user interface can be provided to a user computing device. The user interface can abstract one or more identities of the plurality of different third party platforms. In some implementations, the user interface can include platform-specific information. The platform-specific information can be descriptive of strengths and weaknesses for one or more particular third party platforms of the plurality of different third party platforms.

The systems and methods can receive a request from the user computing device to receive one or more third party service features. The one or more third party service features can be provided via one or more of the plurality of different third party platforms.

The request can be processed to generate a flow representation. The flow representation can include a graphical representation descriptive of a plurality of third party service features provided based on the utilization of the one or more of the plurality of different third party platforms. The plurality of third party service features can include the one or more third party service features. In some implementations, the plurality of third party service features can be determined based on the plurality of datasets. The user interface can include one or more interactive user elements to select utilization of at least one of one or more additional third party service features or one or more additional third party platforms.

In some implementations, the plurality of third party service features can be determined by processing one or more datasets of the plurality of datasets with a skill determination model to determine one or more particular third party services provided by a respective third party platform. The skill determination model can include one or more machine-learned models.

The flow representation can be provided for display via the user interface. The flow representation may be updated based on one or more additional user inputs to adjust the requested third party features. Additionally and/or alternatively, the flow representation may be updated based on one or more additional user inputs to adjust the third party platforms being utilized.

The systems and methods of the present disclosure provide a number of technical effects and benefits. As one example, the system and methods can provide systems and methods for interfacing with a plurality of different third party platforms in a singular user interface with a uniform feel and look. For example, the systems and methods can provide an interface that provides similar features, inputs, data tracking etc. regardless of the third party platform being utilized.

Another technical benefit of the systems and methods of the present disclosure is the ability to leverage a APIs and an iPaaS infrastructure for seamless and quick integration of user preferences when switching between third party platforms. For example, the systems and methods can track and/or store user preferences which can then be imported and exported into different third party platforms to allow for quick and seamless transitions between different third party platforms.

Another example of technical effect and benefit relates to improved computational efficiency and improvements in the functioning of a computing system. For example, the systems and methods disclosed herein can leverage different, APIs, add-ons, and extensions to provide add-on features to one or more third party platforms to provide an equivalent experience to a user between different third party platforms without the computational taxation of contracting with multiple third party platforms at once which can cause redundant features, pricing, and computation.

With reference now to the Figures, example embodiments of the present disclosure will be discussed in further detail.

Example Devices and Systems

FIG. 1 depicts an exemplary computing system 100 that can be used to implement an integration platform according to aspects of the present disclosure. The system 100 has a client-server architecture that includes a server 110 that communicates with one or more client devices 130 over a network 160. However, the present disclosure can be implemented using other suitable architectures, such as a single computing device unconnected to a network. The system 100 can also have a third party computing system 170 to provide a third party platform to a user using the computing system 100.

The system 100 includes a server 110, such as, for example, a web server. The server 110 can be one or more computing devices that are implemented as a parallel or distributed computing system. In particular, multiple computing devices can act together as a single server 110. The server 110 can have one or more processor(s) 112 and a memory 114. The server 110 can also include a network interface used to communicate with one or more remote computing devices (e.g., client devices) 130 over a network 160.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement a client interface 120. The client interface 120 can be configured to provide an interface for a user to interact with a plurality of different third party platforms. In some implementations, the client interface 120 can be configured to provide instructions to a third party computing system 170 to perform a third party service (e.g., a communication platform as a service). In particular, in some implementations, the client interface 120 can be provided for interaction with a user using a client computing system 130 that communicates with the server computing system 110 via a network 160.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include third party data 118 that can be retrieved, manipulated, created, or stored by processor(s) 112. Third party data 118 can include a third party platform (e.g., a communication platform as a service). As an example, third party data 118 can be used to provide a contact center for a user or client.

The third party data 118 can be stored in one or more databases. The one or more databases can be connected to the server 110 by a high bandwidth LAN or WAN, or can also be connected to server 110 through a network 160. The one or more databases can be split up so that they are located in multiple locales.

The server 110 can exchange data with one or more client devices 130 over the network 160. Although two clients 130 are illustrated in FIG. 1, any number of client devices 130 can be connected to the server 110 over the network 160. The client devices 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, a client device 130 can be multiple computing devices acting together to perform operations or computing actions.

Similar to server 110, a client device 130 can include a processor(s) 132 and a memory 134. The memory 134 can store information accessible by processor(s) 132, including instructions that can be executed by processor(s) and data. As an example, memory 134 can store a client preferences element 140 and an application element 142.

Client preferences element 140 can provide instructions for implementing a client profile or client preferences. In particular, the user of client device 130 can exchange data with server 110 by using the stored client preferences to auto-populate client information in an interface or interaction. The third party interface of the present disclosure can be provided as an element of a user interface of the website.

Application element 142 can provide instructions for running a specialized application on client device 130. In particular, the specialized application can be used to exchange data with server 110 over the network 160. Application element 142 can include client-device-readable code for providing and implementing aspects of the present disclosure. For example, application element 142 can provide instructions for implementing an integration platform and/or an interface for abstracting and interfacing with a third party platform.

Although FIG. 1 depicts the client preferences element 140 and the application element 142 being stored in the memory 134 of the computing device, in some implementations, the client preferences element 140 and/or the application element 142 may be stored in the memory 114 of the server computing system 110. Additionally and/or alternatively, the server computing system 110 can include a cloud computing system.

The client device 130 can include various user input devices 150, or input components, for receiving information from a user, such as a touch screen, touch pad, data entry keys, speakers, mouse, motion sensor, and/or a microphone suitable for voice recognition. In some implementations, the server computing system 110 and the third party computing system 170 can include their own input components or may share one or more input components with the client device 130, such that a user may be able to provide input for the third party computing system 170 using the input devices 150 of the client computing device. Further, the client device 130 can have a display 146 for presenting information, such as providing a client interface for third party building. The display 146 can be a visual display including a plurality of visual components for providing the graphical elements of the plate third party interface to a user. The visual display can include a liquid crystal display (LCD), a light-emitting diode display (LED), a plasma display, an organic light-emitting diode display (OLED), and/or a cathode ray tube display (CRT).

The client device 130 can further include a graphics processing unit 152. Graphics processing unit 152 can be used by processor 132 to provide an intermediary third party interface. In some embodiments, client device 130 and/or the server computing system 110 can perform any and all intermediary third party interfaces.

The client device 130 can include a network interface 154 for communicating with server 110 over network 160. Network interface 154 can include any components or configuration suitable for communication with server 110 over network 160, including, for example, one or more ports, transmitters, wireless cards, controllers, physical layer components, or other items for communication according to any currently known or future developed communications protocol or technology.

The network 160 can be any type of communications network, such as a local area network (e.g., intranet), wide area network (e.g., Internet), or some combination thereof. The network 160 can also include a direct connection between a client device 130 and the server 110. In general, communication between the server 110 and a client device 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the network 160 can be used to transfer communication between the client computing device 130 and/or the server computing system 110 to the third party computing system 170. The communications can be instructions 138 generated in response to an interaction with the server computing system interface to request access to a third party platform. For example, the client computing device 130 may receive a plurality of user inputs via the user input component 150 to access a third party platform using the client interface 110. Instructions 138 can then be generated that can be interpreted by the third party computing system 170 to run a third party. Moreover, in some implementations, the instructions 138 can be processed by the one or more processors 172 of the third party computing system 170 in order to understand the instructions. The instructions can be saved to memory or interpreted into a more native format for the third party platform. The third party computing system can further include memory components 174 for locally storing data 176 and instructions 178. The stored data 176 can include data specific to one or more third party platform including third party specific terminology, extensions, and logs. In some implementations, the stored data 176 can include past instructions, information necessary for interpretation, and/or localized models. The stored instructions 178 can include predetermined functions, user-generated functions, and/or trained functions for various tasks the third party computing system can complete. For example, the stored instructions 178 can include a plurality of instructions for processing third party requests built with the client interface 120 and completing third party set-up actions based on the third party request with the client interface 120.

In some implementations, one or more non-transitory computer readable media that collectively store instructions that, when executed by the one or more processors, cause the third party computing system to perform operations can be included in the computing system. In some implementations, the memory components of the client computing device 130, the server computing system 110, and the third party computing system 170 can include the one or more non-transitory computer readable media. The stored instructions can include instructions that cause one or more of the computing systems to perform operations that can include the methods and processes disclosed herein.

In some implementations, one or more of the computing systems can leverage one or more application programming interfaces for automating application interactions. For example, in some implementations, the server computing system 110 may generate and/or store one or more application programming interfaces to facilitate communications with one or more third party computing system 170 applications. Moreover, in some implementations, the one or more application programming interface may be generated in response to one or more client interactions via the client interface 120 and/or the network interface 154.

Example Platform Arrangements

Figure 2:
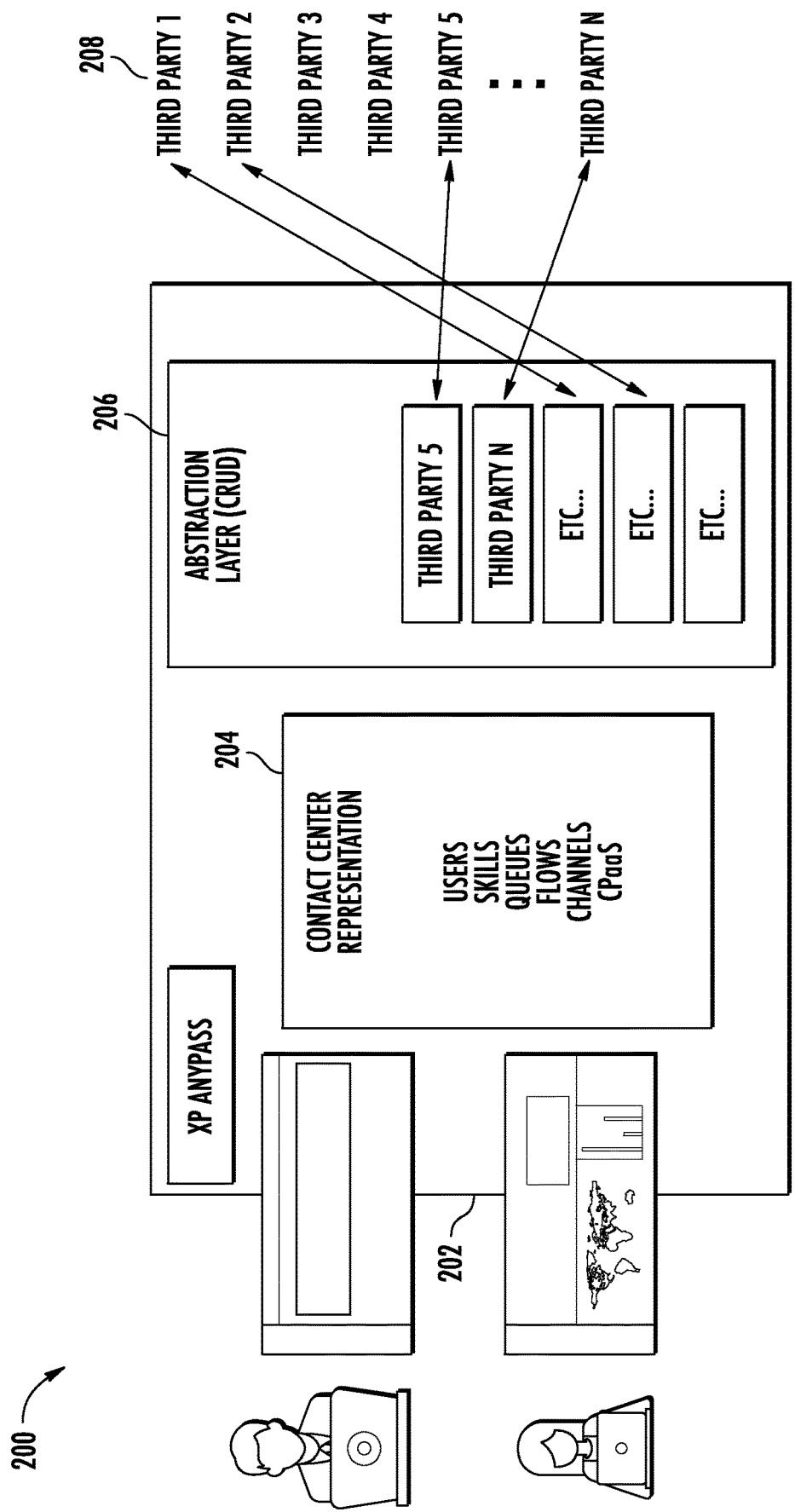
FIG. 2 depicts a block diagram of an example integration platform interface according to example embodiments of the present disclosure.

FIG. 2 depicts a block diagram of an example integration platform interface 200 according to example embodiments of the present disclosure. In some implementations, the integration platform interface 200 can be configured to receive a set of input data 202 from a client computing device descriptive of a request for accessing a third party platform service and, as a result of receipt of the input data, provide output data that is the configuration of a platform for accessing and interacting with a third party computing system. Thus, in some implementations, the integration platform interface 200 can include an abstraction layer that is operable to remove bias between third party platforms 208 and abstract the identity of the third parties.

In particular, a user client can generate and/or provide input data 202 to the integration platform interface via one or more selections to a user interface. The input data 202 can be descriptive of selections of preferences, services, skills, etc. The integration platform interface 200 can include one or more contact center representations 204. The one or more contact center representations 204 can include information on one or more users, contact center skills, contact center queues, contact center flows, contact center channels, and/or CPaaS. The information on the one or more users can include statistics on users being reached, details about user issues, and/or details on time of contact. The information on the contact center skills can include details on the skills and/or the types of services that can be provided by one or more third party platforms. The information on the contact center queues can include volume of users in queues, distribution of user in different queues, time of queues, and/or redistribution of resources based on queues. The information on the contact center flows can include information on the flow of users and questions. The information on the contact center channels can provide a more detailed breakdown of the efficiency and/or the number of channels. The information on the CPaaS can be descriptive of the different CPaaS's used, their capabilities, their reviews, and/or their functions.

In some implementations, the integration platform interface 200 may abstract away information related to which third party platforms 208 are used. The integration platform interface 200 can receive data and/or communicate with a plurality of third party platforms 208 to provide a plurality of skills and/or services. Details regarding the identities of the third party platforms 208 can be abstracted away by an abstraction block (e.g., one or more abstraction layers) before being provided to the clients and/or the users.

Figure 3:
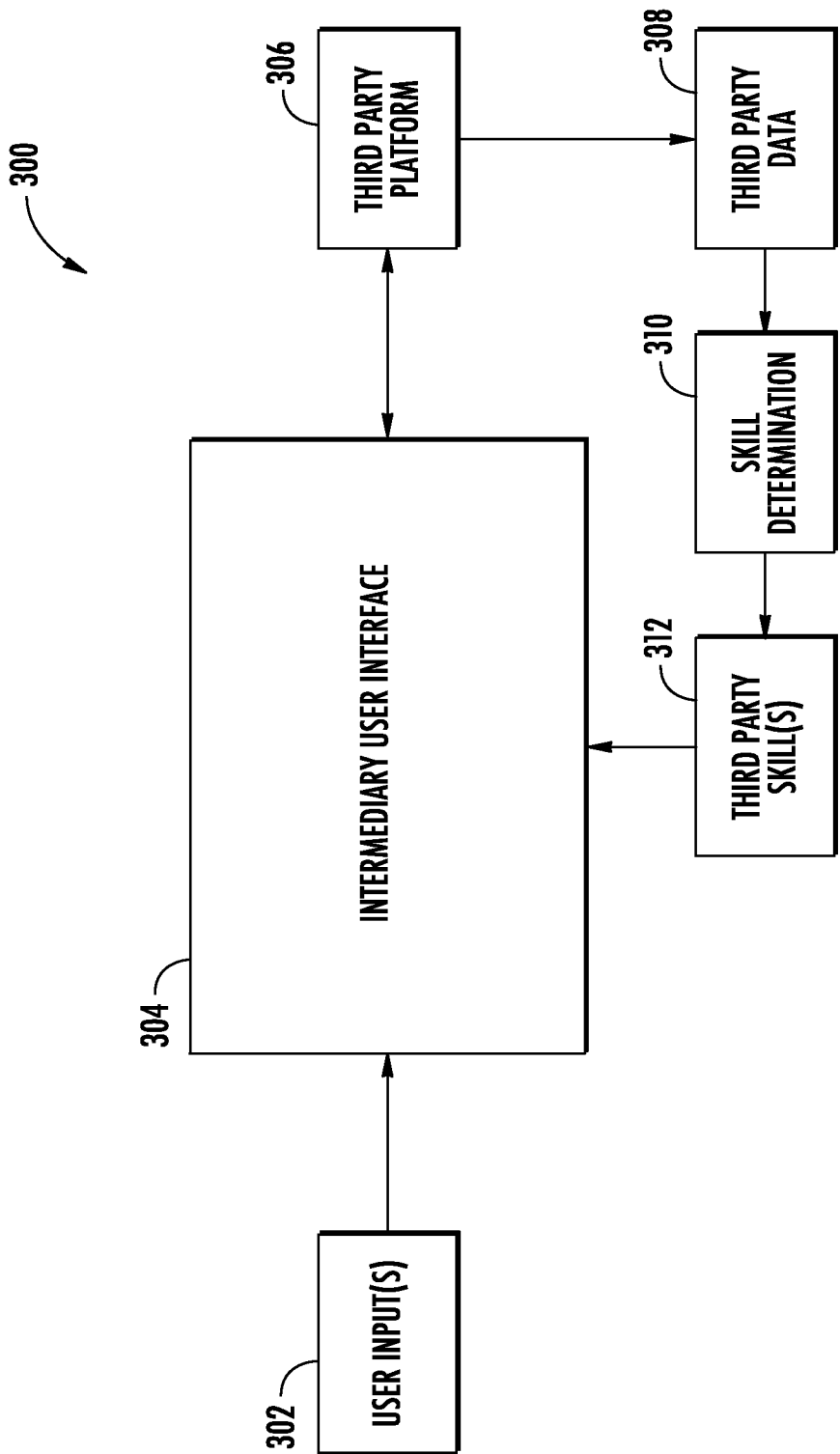
FIG. 3 depicts a block diagram of an example integration platform interface according to example embodiments of the present disclosure.

FIG. 3 depicts a block diagram of an example integration platform interface 300 according to example embodiments of the present disclosure. The integration platform interface 300 is similar to the integration platform interface 200 of FIG. 2 except that the integration platform interface 300 further includes skill determination 310. In particular, the integration platform interface 300 can receive one or more user inputs 302 via an intermediary user interface 304 and can interface with one or more third party platforms 306 to provide one or more services.

Figure 7:
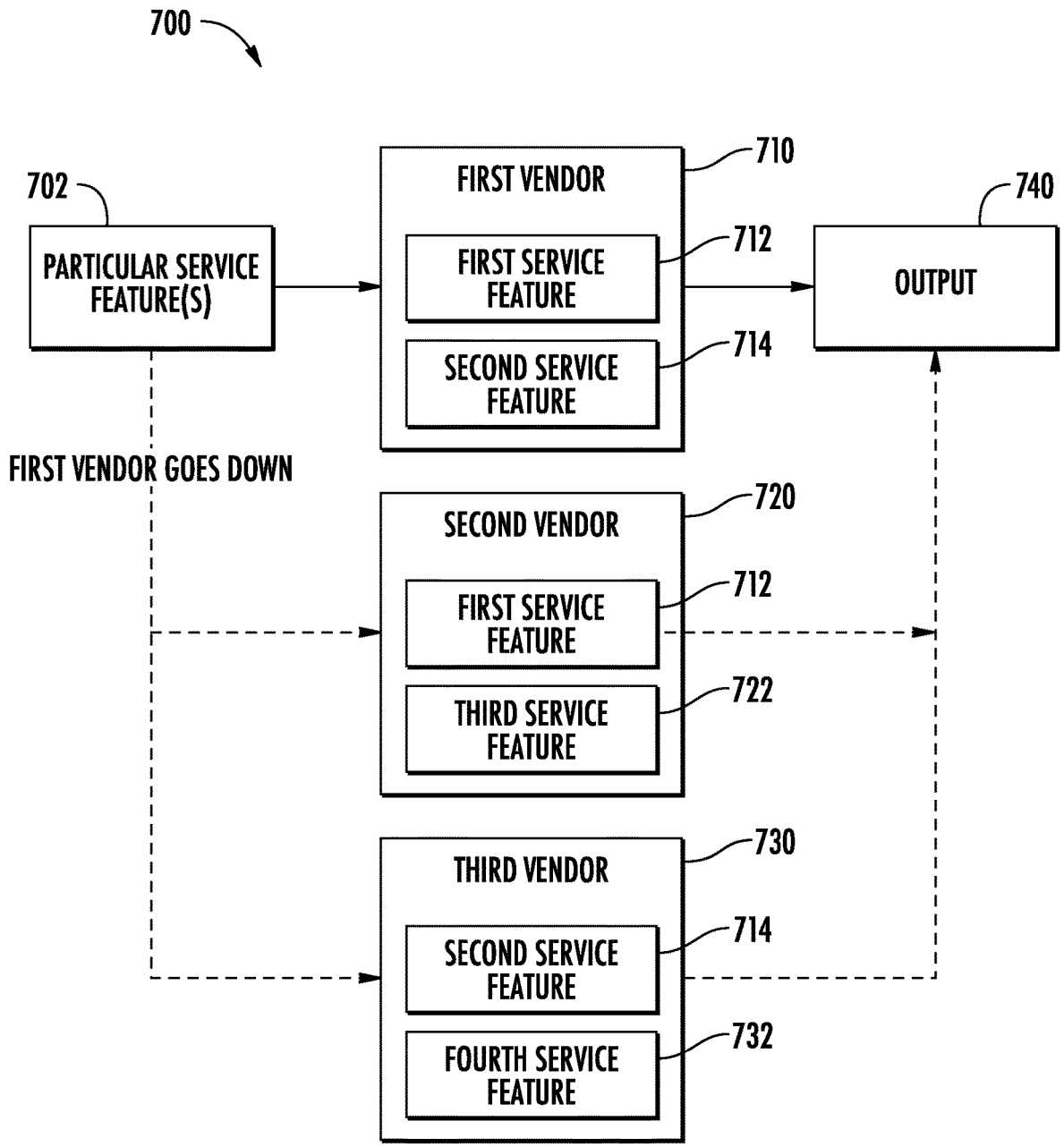
FIG. 7 depicts a block diagram of an example service adjustment according to example embodiments of the present disclosure.

FIG. 7 depicts a block diagram of an example service adjustment 700 according to example embodiments of the present disclosure. In some implementations, a plurality of third party platforms associated with a plurality of third party computing systems (e.g., a plurality of vendors can provide one or more overlapping third party services. The redundancy can be determined and then utilized as a fail safe if one or more utilized third party computing systems go down (e.g., fail or get discontinued).

For example, the user may request one or more particular service features 702. The systems and methods can determine a first vendor 710 (e.g., a vendor associated with a first third party computing system) provides the one or more particular service features 702. The one or more particular service features 702 may include the first service feature 712 and/or the second service feature 714 provided by the first vendor 710. The systems and methods may interface with a plurality of other vendors associated with a plurality of other third party platforms (e.g., a plurality of other third party platforms associated with a plurality of other third party computing systems). In some implementations, the systems and methods may determine each of the plurality of other vendors provide one or more service features. For example, a second vendor 720 (e.g., a vendor associated with a second third party computing system) may provide a first service feature 712 and a third service feature 722, and a third vendor 730 (e.g., a vendor associated with a third, third party computing system) may provide a second service feature 714 and a fourth service feature 732. The first service feature 712 of the first vendor 710 may be associated with the first service feature 712 of the second vendor 720. Additionally and/or alternatively, the second service feature 714 of the first vendor 710 may be associated with the second service feature 714 of the third vendor 730.

In some implementations, the systems and methods can utilize a first vendor 710 to provide a particular output 740 (e.g., a particular set of services (e.g., different types of communication services for handling customer service issues)). However, a first vendor 710 may go down (e.g., the first platform may be disabled for maintenance, may have a network error, and/or may lose access to one or more service features). In an instance in which a utilized platform goes down, the systems and methods may determine one or more other vendors to be utilized based on one or more determined redundancies.

For example, the one or more particular service features 702 can include the first service feature 712. In response to the first vendor 710 going down, the systems and methods can interface with the second vendor 720 to provide the first service feature 712 via the second vendor 720. Additionally and/or alternatively, the one or more particular service features 702 can include the second service feature 714. In response to the first vendor 710 going down, the systems and methods can interface with the third vendor 720 to provide the second service feature 714 via the third vendor 730. Therefore, despite the first vendor 710 going down, the systems and methods can continue to provide the desired output 740 despite the disconnect. The rerouting may be performed without providing any indicator to the user and/or the clients associated with the user. Alternatively and/or additionally, a notification may be generated and provided to one or more users.

Service features can be associated with one or more skills. Service features can be descriptive of aspects of a particular service (e.g., a medium for performing the service, a time to completion of the service per instance, the routing determination for the particular service, number of channels utilized for the particular service, and/or the location where the service is performed). Skills can be associated with how and/or what is performed by a third party computing system. For example, a third party platform associated with a third party computing system can include services tailored to providing a service associated with a particular skill (e.g., information technologies customer service via web chat, interface navigation customer service via remote access control, user experience tailoring via phone services, etc.).

In some implementations, each service provided by a third party computing system may include and/or be associated with one or more service features and/or one or more skills. A service can be one or more actions performed based in part on one or more interactions with a third party computing system. The actions can include contact center actions (e.g., handling customer service questions over the phone, via web chat, via video conferencing, and/or via remote access control). Alternatively and/or additionally, the actions can include predictions generated based on client inputs and/or based on user inputs. In some implementations, the actions can include the collection, aggregation, and/or the analyzing of data.

Figure 8:
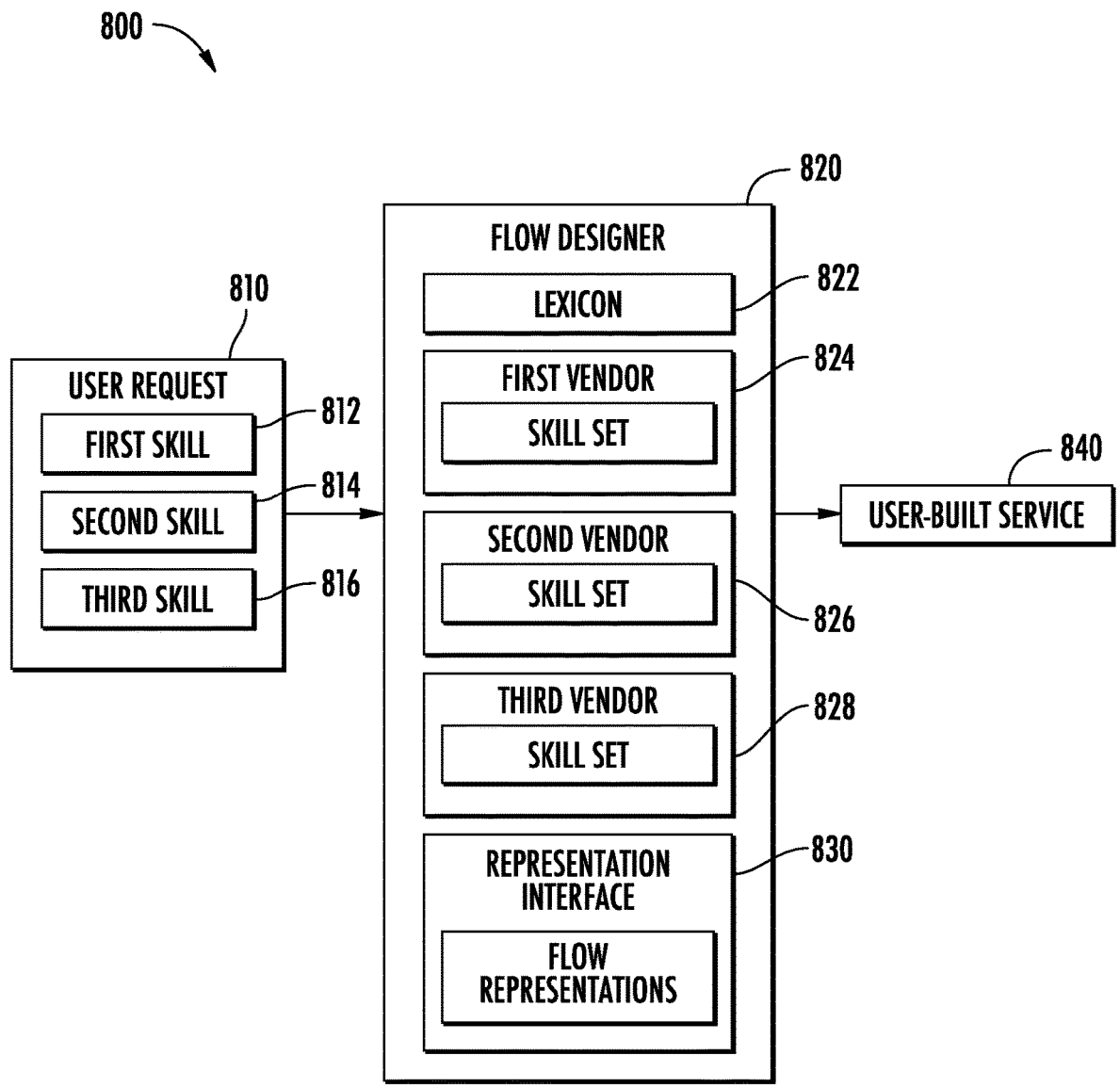
FIG. 8 depicts a block diagram of an example flow designer system according to example embodiments of the present disclosure.

FIG. 8 depicts a block diagram of an example flow designer system 800 according to example embodiments of the present disclosure. The flow designer system 800 can be utilized to provide a graphical representation of features and/or services provided by a plurality of third party computing systems. The graphical representation may be adjusted based on one or more features, skills, and/or platforms being selected and/or deselected by a user.

For example, a user can provide one or more user inputs, which can be utilized to generate a user request 810. The user request 810 can include one or more requested skills based on one or more selections and/or one or more preferences. The one or more requested skills can include a first skill 812, a second skill 814, and/or a third skill 816. The user request 810 can be input into the flow designer interface 820. The flow designer interface 820 can include a lexicon that provides uniform terms for defining the plurality of possible skills such that an analogous skill provided by a first vendor 824 and a second vendor 826 are provided with one or more same terms to label the analogous skills. The flow designer interface 820 can determine and/or store information associated with the skill sets for a plurality of vendors (e.g., a plurality of platforms associated with a plurality of third party computing systems). The plurality of vendors can include a first vendor 824 with a first skill set, a second vendor 826 associated with a second skill set, and/or a third vendor 828 associated with a third skill set. The stored skill set data, the determined redundancies, the lexicon, and/or the user request 810 can be utilized generate and/or to update a representation interface 830. The representation interface 830 can provide a flow representation for display. The flow representation can include a graphical representation of one or more skills and/or features provided by one or more services and/or one or more platforms. The flow representation can be generated and/or updated as a user provides and/or updates the user request 810.

In some implementations, the user can interact with the flow designer interface 820 to generate theoretical service packages, which can then be utilized to preview a user-built service 840, which can include a plurality of skills. The user can then finalize the user-built service 840 and can begin receiving the generated service package.

The flow representation can include a skill tree (e.g., a tree diagram depicting possible skills in a branched manner), a list (e.g., an itemized list of skills), icons (e.g., different graphical icons for different skills), information webs (e.g., skills notated with lines connecting the utilized skills), and/or a skill map.

The flow designer system 800 can include one or more software development kits (SDK) and/or one or more application programming interfaces (API). The software development kits can be provided to third party computing systems to have intermediary blocks generated by particular platforms. Alternatively and/or additionally, the software development kit may be sent to a user to provide a package for a user to generate a user-specific software package. Additionally and/or alternatively, the one or more application programming interfaces can be utilized to interface with the one or more third party computing systems.

Figure 9:
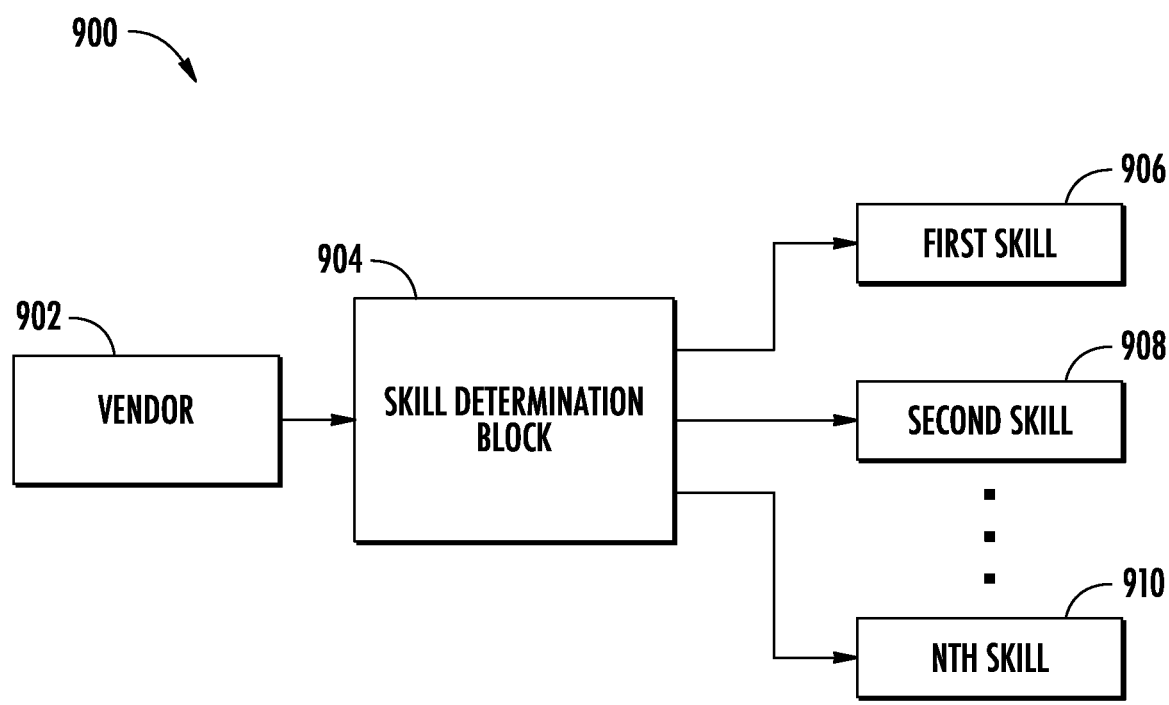
FIG. 9 depicts a block diagram of an example skill approximation system according to example embodiments of the present disclosure.

FIG. 9 depicts a block diagram of an example skill approximation system 900 according to example embodiments of the present disclosure. The skill approximation system 900 can be utilized to determine one or more skills provided by and/or utilized by one or more third party platforms. For example, vendor data can be obtained from a vendor 902 (e.g., via a third party computing system associated with a third party platform). The vendor data can include routing data, historical usage data, platform interface data, and/or about data. The vendor data can be processed with a skill determination block 904 to determine one or more skills provided by the vendor 902. For example, the vendor data from the vendor 902 can be processed with the skill determination block 904 to determine the vendor 902 provides a first skill 906, a second skill 904, and/or an nth skill 910.

The skill determination block 904 can include one or more machine-learned models trained to determine skills based on one or more learned parameters. Alternatively and/or additionally, the skill determination block 904 can determine the skills based on heuristics. The skill determination can be based on the routing of service instances, based on historical usage of one or more service features, based on interface options provided in an interface of the web platform, based on mathematical heuristics, based on a service description, based on metadata, and/or based on data found via crawling a database or repository of information. Software of the third party platforms may be processed (e.g., parsed, segmented, and classified) in order to determine the one or more skills. The determined skills can then be utilized to generate a skill representation for the particular vendor or platform. The skill determination can be utilized for skill-based routing such that if a particular criteria is met, a particular service or platform may be utilized. Additionally and/or alternatively, the skill can be determined, or inferred, based on if-then routing. The skill determination block 904 may read queues, read action chains, read communication chains, and/or read data structures. In some implementations, the skill determination block 904 may determine unique routes based on the skill involved, based on an inferred mapping skill, and/or based on a determined possible aggregation of skills.

In some implementations, the skills can then be isolated and utilized to provide add-on features to service packages provided to users. The skill-based service packages can be tailored based on user requests. The systems and methods disclosed herein can utilize skill determination to represent and determine skills for third party platforms that may be a "non-skills-based routing contact center."

Example Methods

Figure 4:
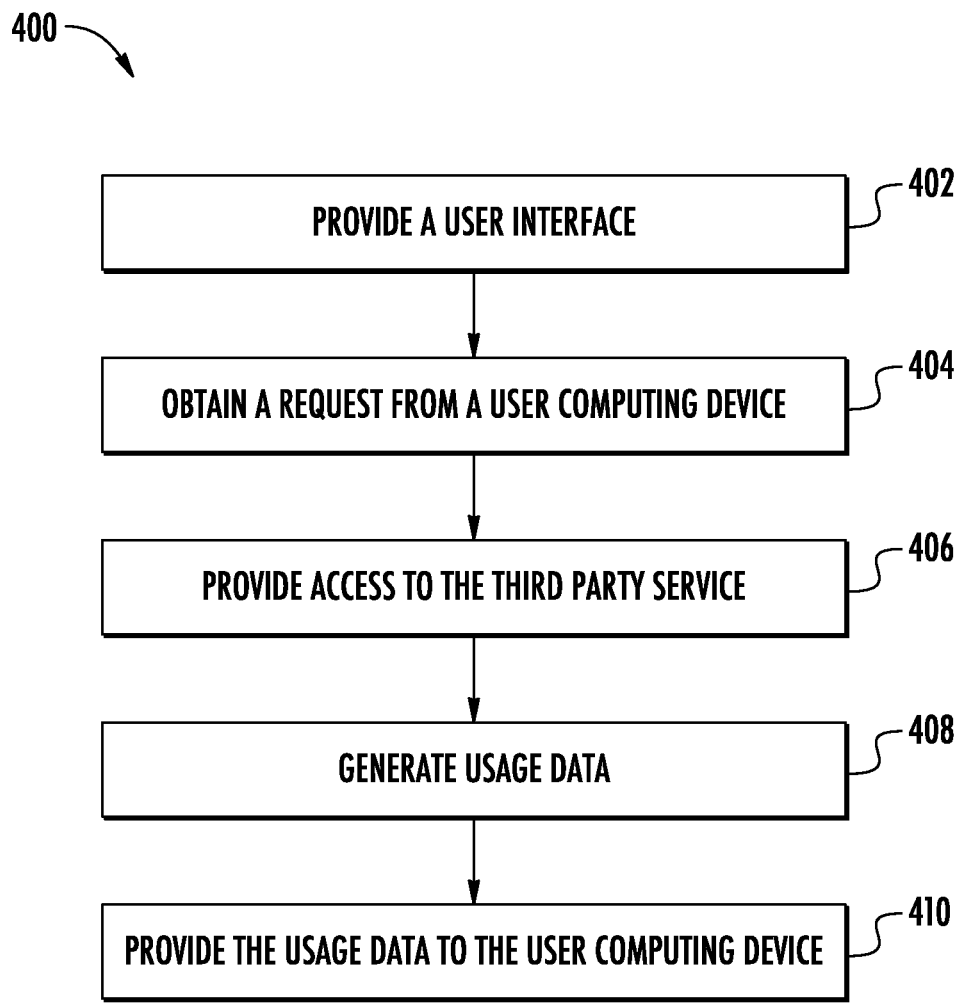
FIG. 4 depicts a flow chart diagram of an example method to perform user and third party intermediary interfacing according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can provide a user interface. In some implementations, the user interface can include one or more interactive elements. The one or more interactive elements can be associated with one or more options or preferences. For example, the user interface can include a plurality of interactive elements for customizing a contact center to be requested for launching.

At 404, the computing system can obtain a request from a user computing device. In some implementations, the request can be a request to receive a third party service from a third party computing system. Alternatively and/or additionally, the request can be a request to receive a third party service without a reference to a particular third party computing system or a third party platform. The third party service may be a particular service provided by the third party computing system. The computing system can then determine the third party computing system provides the third party service. The request can be received via an interaction with the one or more interactive elements of the user interface. In some implementations, the third party service can include a communication platform as a service. For example, the request may be generated based on one or more inputs to the user interface descriptive of contact center preferences. The contact center preferences can be associated with one or more communication platform as a service features to specific to one or more specific platforms.

At 406, the computing system can provide access to the third party service. Providing access to the third party service can include providing access to one or more clients associated with the user computing device. The access to the third party service can be provided via the third party computing system. Information descriptive of the third party may be abstracted such that the one or more clients are not provided information identifying the third party. The third part service can include one or more contact center services. The third party service can be provided via an intermediary user interface that obfuscates the user interface provided by the particular third party.

In some implementations, providing access can include obtaining client data from the one or more clients associated with the user computing device, retrieving third party data from the third party computing system based on the client data, and providing the third party data to the user computing device.

At 408, the computing system can generate usage data. The usage data can include usage data associated with a use of the third party service by the one or more clients associated with the user computing device. The usage data can include a quantization of an amount of the third party service used by the one or more clients associated with the user computing device. Generating the usage data can include removing information descriptive of an entity identity associated with the third party computing system from recordation data. The entity identity can include one or more identifiers for a third party associated with the third party computing system. In some implementations, the recordation data can be descriptive of one or more interactions with the one or more clients.

At 410, the computing system can provide the usage data to the user computing device. The usage data can be provided in a widget, in a notification, and/or in a user interface element. The usage data may be provided as a generated report.

In some implementations, the computing system can provide access to a second third party service to the one or more clients associated with the user computing device. The second third party service can be provided by a second third party computing system. In some implementations, the third party computing system and the second third party computing system may be different. Additionally and/or alternatively, the computing system can generate second usage data associated with a use of the second third party service by the one or more clients associated with the user computing device, determine combined usage data based on the usage data and the second usage data, and provide the combined usage data to the user computing device.

Additionally and/or alternatively, the computing system can determine communication with the third party computing system is interrupted. Determining communication with the third party computing system is interrupted can include determining one or more application programming interfaces experience an error associated with a particular action not being able to be performed. Alternatively and/or additionally, determining communication with the third party computing system is interrupted can include a notification associated with the third party computing system indicating a platform error. The determination may be based on web error notification. The computing system can determine one or more additional third party computing systems provide the third party service. Determining the one or more additional third party computing systems provide the third party service can include determining one or more skills provided by the one or more additional third party computing systems based on routing data for the one or more additional third party computing systems. In some implementations, the third party service can include the one or more skills. The computing system can provide access to the third party service, via the one or more additional third party computing systems, to the one or more clients associated with the user computing device.

Figure 5:
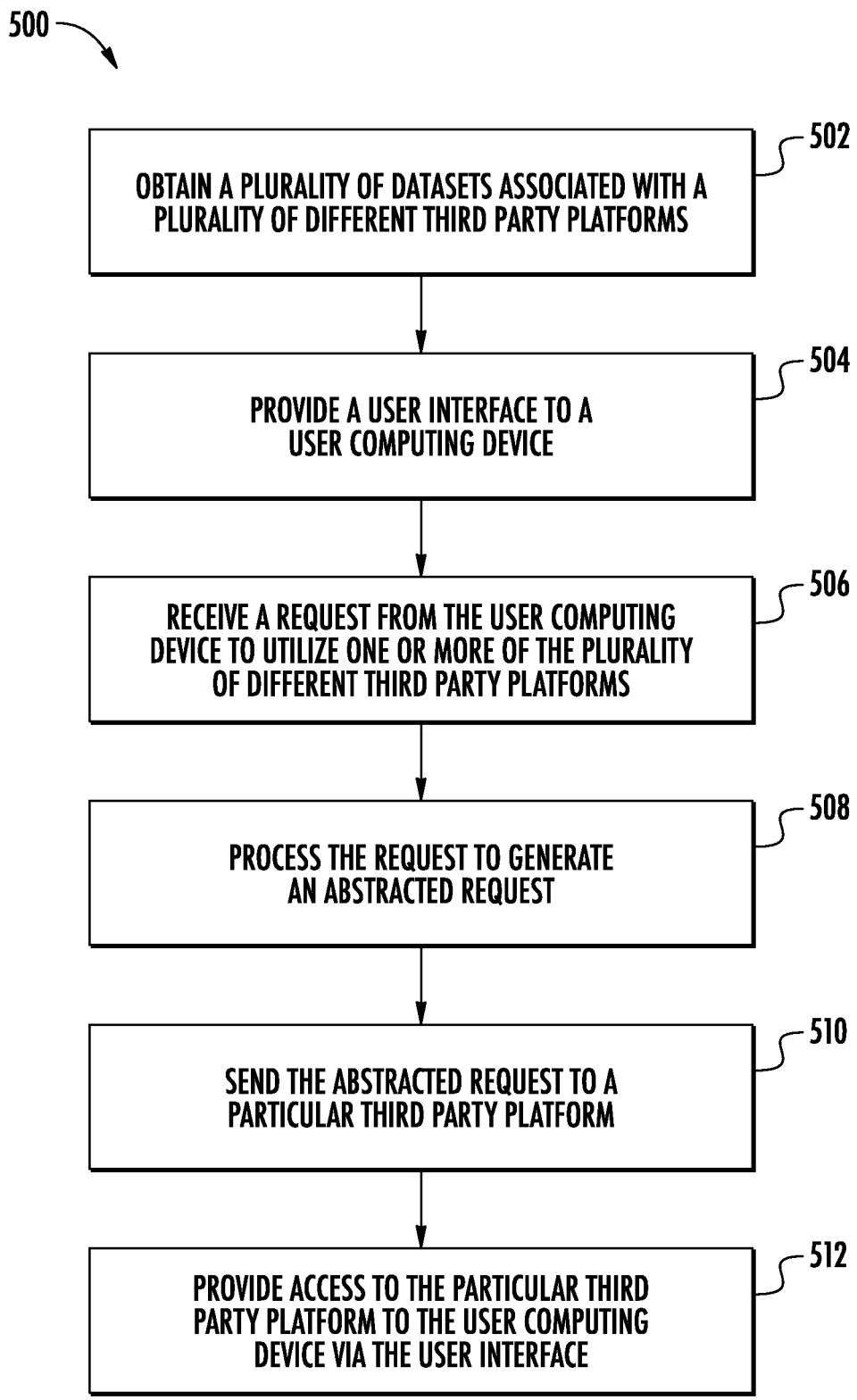
FIG. 5 depicts a flow chart diagram of an example method to perform abstraction and interaction with a third party platform according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a plurality of datasets associated with a plurality of different third party platforms. Each of the plurality of datasets may be associated with the services of a different respective third party platform of the plurality of different third party platforms. The plurality of datasets can include explicit details on the one or more services provided by a third party platform and/or implicit (or inferred) details on the one or more services.

At 504, the computing system can provide a user interface to a user computing device. In some implementations, the user interface can abstract one or more identities of the plurality of different third party platforms. In some implementations, the user interface can include one or more add-on features that determine and provide data associated with a service provided by the particular third party platform.

At 506, the computing system can receive a request from the user computing device to utilize one or more of the plurality of different third party platforms. The request may be generated based on one or more selections to the user interface. The one or more selections may be associated with one or more explicit services and/or one or more implicit services of the one or more third party platforms.

At 508, the computing system can process the request to generate an abstracted request. The abstracted request can remove one or more identifiers associated with the user. The abstraction can hide personal information associated with the user while providing a detailed request on desired contact center services.

At 510, the computing system can send the abstracted request to a particular third party platform. The particular third party platform can include a contact center. The third party platform may process the abstracted request to determine one or more service packages that are associated with the one or more preferences of the request.

At 512, the computing system can provide access to the particular third party platform to the user computing device via the user interface. The access can be provided via an intermediary interface that differs from a platform user interface provided by the third party platform. For example, the intermediary system may be configured to provide an intermediary user interface such that when a selection is received directed to the intermediary user interface, one or more application programming interfaces can interact with the platform user interface to cause the third party platform to complete a desired action without the user interacting directly with the platform user interface.

In some implementations, the computing system can include providing a plurality of interactive elements associated with a plurality of different contact center features. The plurality of interactive elements can be associated with service options, contact center documentation or tracking, and/or profile data.

Figure 6:
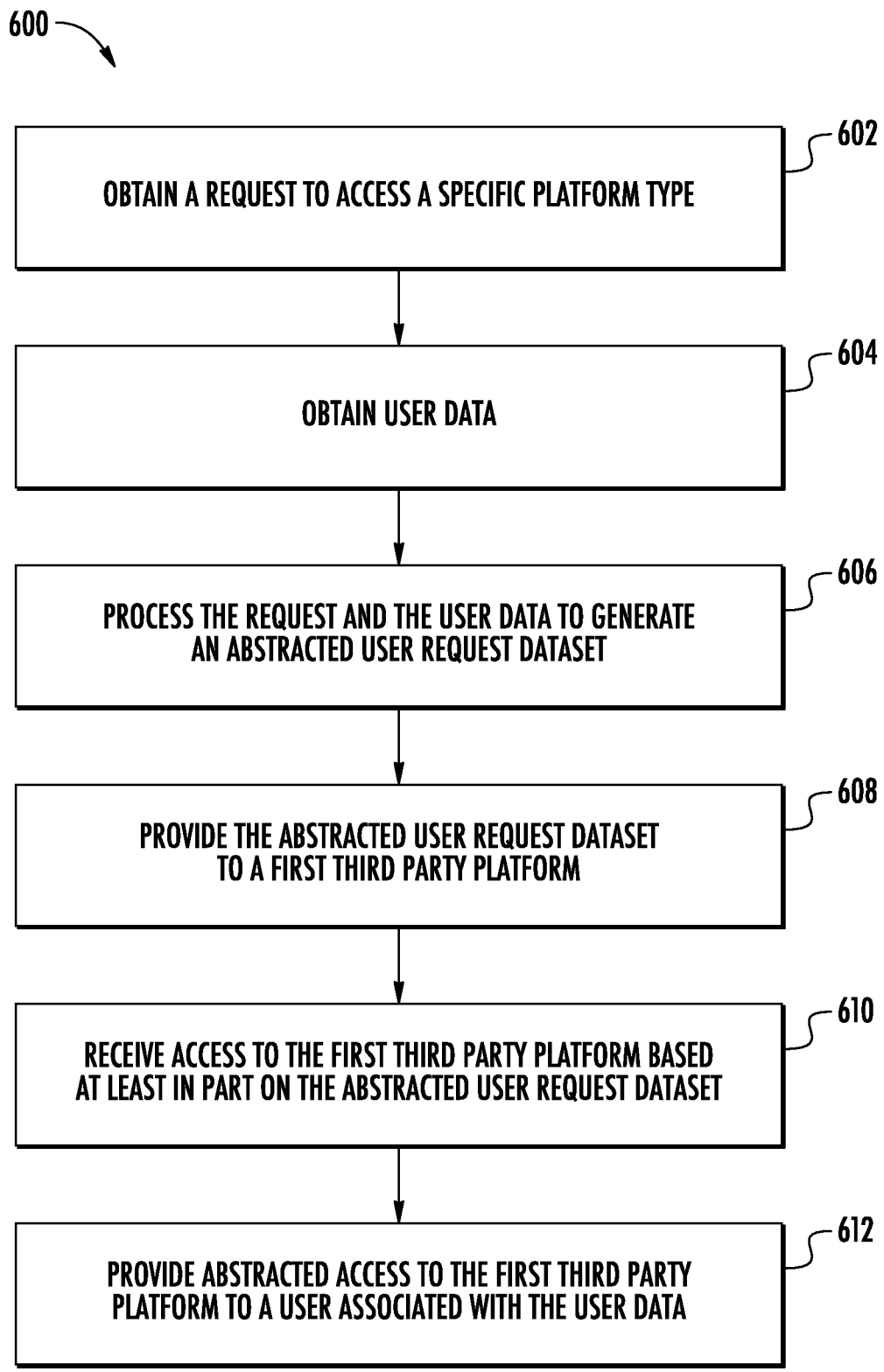
FIG. 6 depicts a flow chart diagram of an example method to perform abstraction and interaction with a third party platform according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a request to access a specific platform type. The specific platform type can include a communication platform. In some implementations, the communication platform can include a contact center feature. The contact center feature can include one or more mediums for obtaining client data and providing answer data in response to the client data.

At 604, the computing system can obtain user data. In some implementations, the user data can include one or more user preferences. The user preferences may be based on user selections. Alternatively and/or additionally, the user preferences may be inferred and/or determined based on previous user interactions.

At 606, the computing system can process the request and the user data to generate an abstracted user request dataset. The abstracted user request dataset can abstract and/or obfuscate the data descriptive of the particular user associated with the request.

At 608, the computing system can provide the abstracted user request dataset to a first third party platform. The abstracted user request dataset can be provided via one or more application programming interfaces. The first third party platform can be associated with a first contact center platform.

At 610, the computing system can receive access to the first third party platform based at least in part on the abstracted user request dataset. The access may be provided via an intermediary user interface that provides the services of the first third party platform in a centralized web application.

At 612, the computing system can provide abstracted access to the first third party platform to a user associated with the user data. Abstracted access to the first third party platform can be provided via a user interface that provides the abstracted access without providing third party platform identifiers. In some implementations, the abstracted access can be provided via a user interface including a plurality of interactive features. The plurality of interactive features can include one or more add-on interactive features provided in addition to one or more first third party platform features. The one or more add-on interactive features can include tracking data associated with a usage of the first third party platform.

In some implementations, the computing system can obtain an updated request to switch platforms, provide the abstracted user request dataset to a second third party platform, receive access to the second third party platform, and provide abstracted access to the second third party platform. Additionally and/or alternatively, the computing system may provide a cancel request to the first third party platform.

In some implementations, the computing system can obtain one or more inputs associated with the abstracted access to the first third party platform and adjust the one or more user preferences of the user data.

Figure 10:
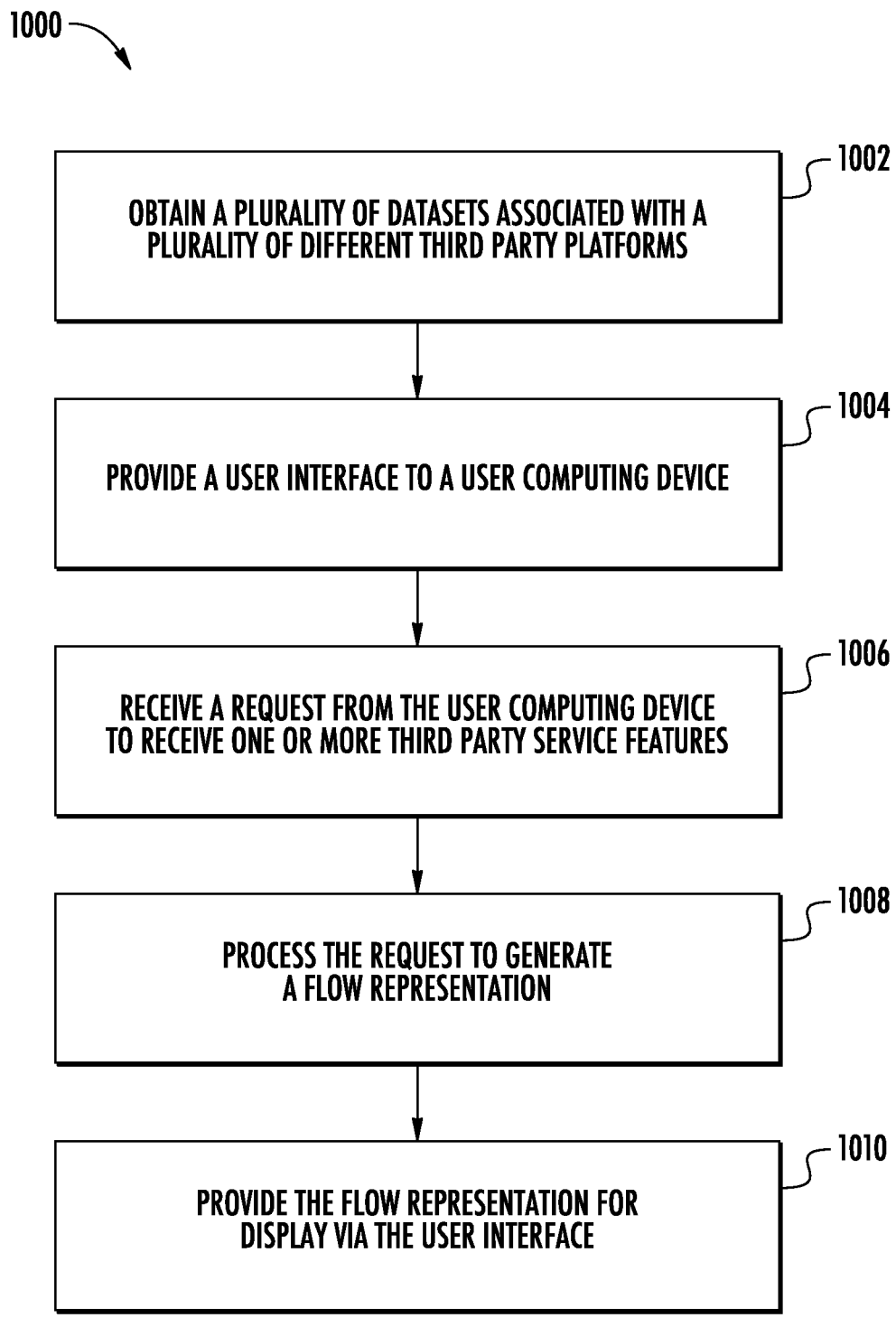
FIG. 10 depicts a flow chart diagram of an example method to perform flow representation generation according to example embodiments of the present disclosure.

FIG. 10 depicts a flow chart diagram of an example method to perform according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain a plurality of datasets associated with a plurality of different third party platforms. The plurality of datasets can include metadata associated with the plurality of different third party platforms. Additionally and/or alternatively, the plurality of datasets can include data descriptive of one or more third party services provided by each of the plurality of different third party platforms. In some implementations, the plurality of datasets can include routing data, historical data, and/or identification data associated with each of the plurality of different third party platforms.

At 1004, the computing system can provide a user interface to a user computing device. The user interface can abstract one or more identities of the plurality of different third party platforms. In some implementations, the user interface can include platform-specific information. The platform-specific information can be descriptive of strengths and weaknesses for one or more particular third party platforms of the plurality of different third party platforms.

At 1006, the computing system can receive a request from the user computing device to receive one or more third party service features. The one or more third party service features can be provided via one or more of the plurality of different third party platforms.

At 1008, the computing system can process the request to generate a flow representation. The flow representation can include a graphical representation descriptive of a plurality of third party service features provided based on the utilization of the one or more of the plurality of different third party platforms. The plurality of third party service features can include the one or more third party service features. In some implementations, the plurality of third party service features can be determined based on the plurality of datasets. The user interface can include one or more interactive user elements to select utilization of at least one of one or more additional third party service features or one or more additional third party platforms.

In some implementations, the plurality of third party service features can be determined by processing one or more datasets of the plurality of datasets with a skill determination model to determine one or more particular third party services provided by a respective third party platform. The skill determination model can include one or more machine-learned models.

At 1010, the computing system can provide the flow representation for display via the user interface. The flow representation may be updated based on one or more additional user inputs to adjust the requested third party features. Additionally and/or alternatively, the flow representation may be updated based on one or more additional user inputs to adjust the third party platforms being utilized.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
    obtaining, by a computing system comprising one or more processors, a plurality of datasets associated with a plurality of different third party platforms;
    providing, by the computing system, a user interface to a user computing device, wherein the user interface abstracts one or more identities of the plurality of different third party platforms;
    receiving, by the computing system, a request from the user computing device to receive one or more third party service features, wherein the one or more third party service features are provided via one or more of the plurality of different third party platforms;
    processing, by the computing system, the request to generate a flow representation, wherein the flow representation comprises a graphical representation descriptive of a plurality of third party service features provided based on the utilization of the one or more of the plurality of different third party platforms, wherein the plurality of third party service features comprises the one or more third party service features, wherein the plurality of third party service features are determined based on processing the plurality of datasets with a skill determination model;
    providing, by the computing system, the flow representation for display via the user interface;
    generating, by the computing system, service package comprising a plurality of skills associated with the one or more third party service features based on the flow representation; and
    providing, by the computing system, the service package to a user associated with the user computing device, wherein providing the service package to the user comprises:
        providing abstracted access to the one or more of the plurality of different third party platforms to the user computing device.

2. The computer-implemented method of claim 1, wherein the user interface further comprises one or more interactive user elements to select utilization of at least one of one or more additional third party service features or one or more additional third party platforms.

3. The computer-implemented method of claim 1, wherein the user interface comprises platform-specific information, wherein the platform-specific information is descriptive of strengths and weaknesses for one or more particular third party platforms of the plurality of different third party platforms.

4. The computer-implemented method of claim 1, wherein the plurality of third party service features are determined by:
    processing, by the computing system, one or more datasets of the plurality of datasets with the skill determination model to determine one or more particular third party services provided by a respective third party platform, wherein the skill determination model comprises one or more machine-learned models.

5. A computing system, the computing system comprising:
    one or more processors; and
    one or more non-transitory computer-readable media that collectively store instructions that, when executed by the one or more processors, cause the computing system to perform operations, the operations comprising:
        obtaining a plurality of datasets associated with a plurality of different third party platforms;
        providing a user interface to a user computing device, wherein the user interface abstracts one or more identities of the plurality of different third party platforms;
        receiving, by the computing system, a request from the user computing device to receive two or more third party service features, wherein the two or more third party service features are provided via two or more of the plurality of different third party platforms;
        processing the request to generate a flow representation, wherein the flow representation comprises a graphical representation descriptive of a plurality of third party service features provided based on the utilization of the one or more of the plurality of different third party platforms, wherein the plurality of third party service features comprises the two or more third party service features, wherein the plurality of third party service features are determined based on processing the plurality of datasets with a skill determination model, wherein the plurality of third party service features are determined by:
- processing, by the computing system, one or more datasets of the plurality of datasets with the skill determination model to determine one or more particular third party services provided by a respective third party platform, wherein the skill determination model comprises one or more machine-learned models;

providing the flow representation for display via the user interface;

generating, by the computing system, service package comprising a plurality of skills associated with the two or more third party service features based on the flow representation; and providing, by the computing system, the service package to a user associated with the user computing device, wherein providing the service package to the user comprises: providing abstracted access to the one or more of the plurality of different third party platforms to the user computing device;

determining communication with one of the two or more of the plurality of different third party platforms is interrupted;

determining one or more additional third party platforms provide a particular third party service associated with the one of the two or more of the plurality of different third party platforms, wherein determining the one or more additional third party platforms provide the particular third party service comprises determining one or more skills provided by the one or more additional third party platforms based on routing data associated with the flow representation; and providing access to the particular third party service, via the one or more additional third party platforms, to the one or more clients associated with the user computing device.

* * * * *